March 14, 1933.  W. N. BARLOW  1,901,429
METHOD AND MEANS FOR SOUND CORRECTION IN AN ELECTRIC CIRCUIT
Filed April 23, 1930   3 Sheets-Sheet 1
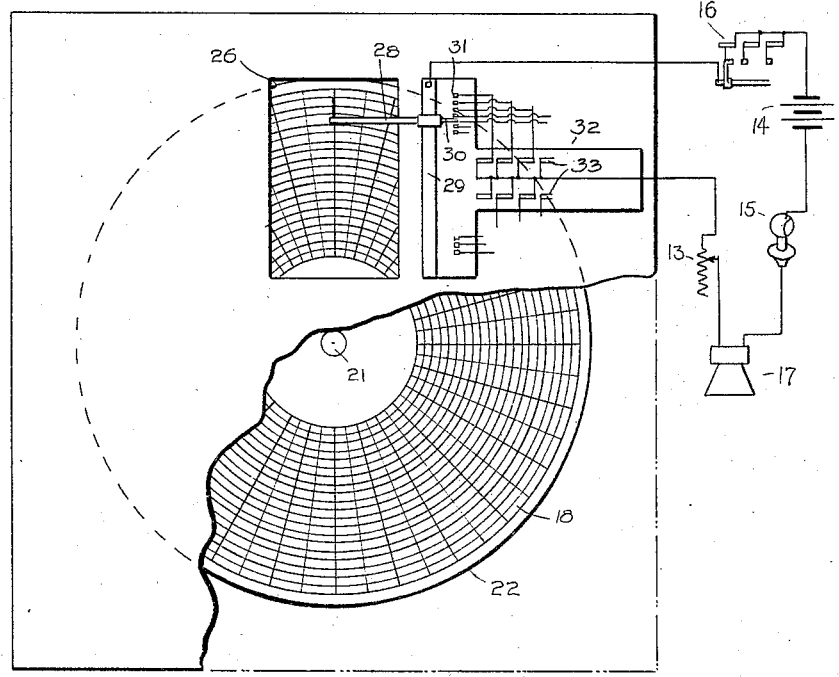
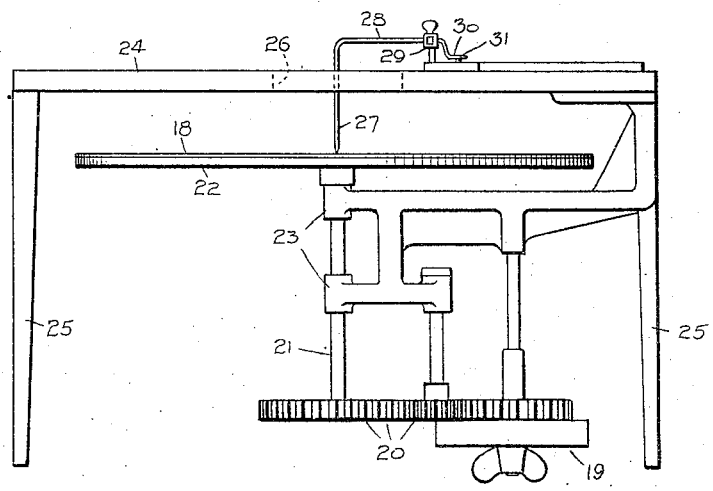
INVENTOR
William N. Barlow
BY Edwin Levisohn
ATTORNEY

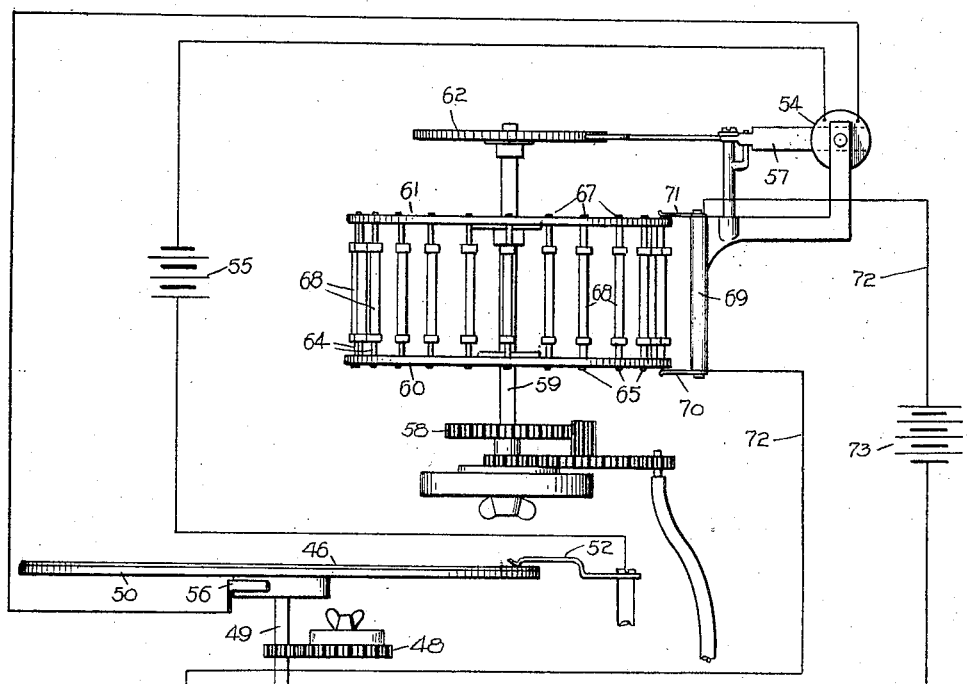
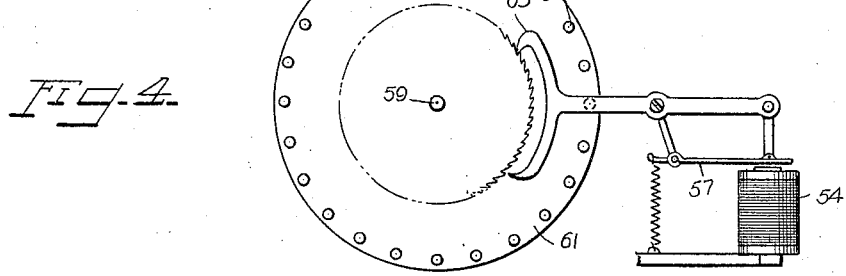

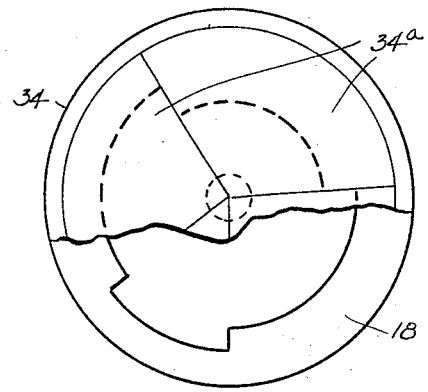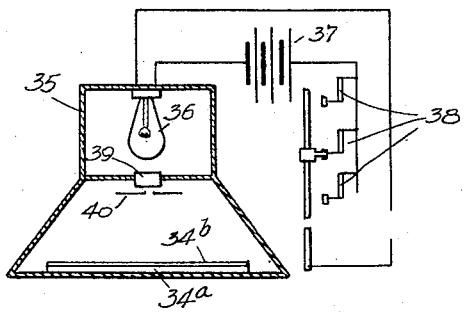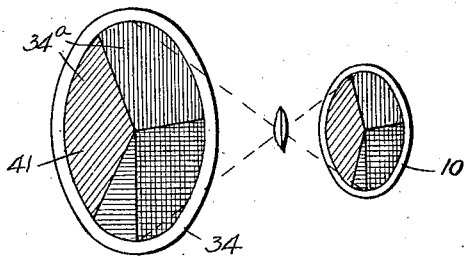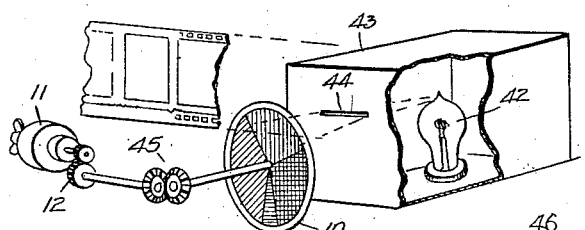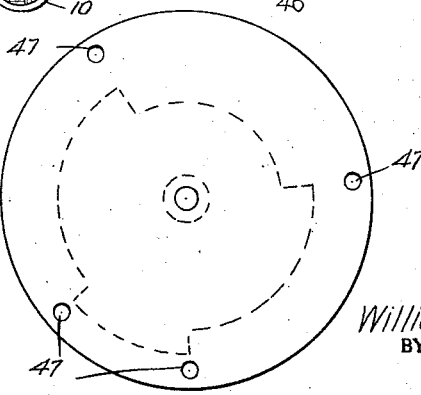

Patented Mar. 14, 1933

1,901,429

UNITED STATES PATENT OFFICE

WILLIAM N. BARLOW, OF YONKERS, NEW YORK

METHOD AND MEANS FOR SOUND CORRECTION IN AN ELECTRIC CIRCUIT

Application filed April 23, 1930. Serial No. 446,692.

My invention relates to improvements in the method of and apparatus for automatically controlling the sound volume in a sound reproduction apparatus used in connection with motion picture projection machines.

This invention has for its object to provide a modulator for sound reproduction or for other apparatus requiring the variance of an electric circuit, where a light sensitive cell is in use, in combination with a light of fixed intensity, a light sensitive electric cell or unit, an electric current designed to pass through the light sensitive cell and a photographic screen used between the light and the photo electric cell, said photographic screen having its shades fixed in proportion to certain predetermined intensities and periods of time.

With the foregoing in mind, I have devised apparatus for carrying out my invention which for the purpose of illustration and description I am dividing into several units, of which the first is a device for printing positive film pictures from a negative, thereafter introducing predetermined corrections in the print, which do not appear in the negative film, by means of varying the photographic light used through the introduction into the circuit of selected and predetermined resistance elements, in predetermined sequence and periods of time.

A complete embodiment of my invention is illustratively exemplified in the accompanying drawings, in which Figure 1 is a plan view of the rheostat recording means which I use to produce a corrective chart; Figure 2 is a side elevational view of the same; Figure 3 is a side elevational view of the controlling device; and Figure 4 is a top plan view of a portion thereof; Figure 5 is a plan view of the chart and segmental disc; Figure 6 is a diagrammatic view of the means used to expose the segments; Figure 7 is a perspective view of the exposed segmental plate and shaded plate made therefrom; Figure 8 is a diagrammatic view of the means utilizing the shaded plate in the light tract; and Figure 9 is a plan view of the celluloid disc used in the circuit forming part of Figure 3.

It is well known that sound may be reproduced after a photo sensitive film has been affected by sound waves and then exposed between a light of fixed intensity and a light sensitive or photo electric cell, the latter being in an electric circuit embracing a source of current supply and amplifying means for reproduction.

It is further known that more or less light falling through this photo film to the light sensitive cell will increase or decrease the current through the cell and consequently enlarge or reduce the volume of the sound it finally reproduces, the said enlargement or reduction being in proportion to the increased or decreased light used.

With the foregoing in mind, the present device comprehends a means for interpositioning between the light and the light sensitive cell, a screen with predetermined shades, which in themselves will increase or decrease the affective light passing through to the light sensitive cell, the screen being oscillatory or rotary so that successive shades are presented across the path of the light in a predetermined sequence.

Referring to Figure 8 of the drawings, 10 denotes this shaded screen, which in the embodiment shown, is rotated by means of a train of gears 12 connected to a spring motor 11. The screen 10 is produced by means of the following apparatus.

A recording fader or variable resistance unit 13 is temporarily placed in a circuit normally used for the sound reproduction, the circuit embracing an A storage battery 14, a photo electric cell 15, so called house fader 16 and an amplifying apparatus 17.

The house fader 16 which is normally used is set at zero, so that the maximum sound will be reproduced. This is done even if the sound recording film is quite dark and permits little light to pass through it to the photo cell 15. The recording fader 13 in the circuit is now intended to add just the required amount of resistance or impedance therein to give the sound correctly, the fader 13 being manually operated and at the same time recording the exact location of the particular fader contact which produces the desired sound together with the exact proportioned time at which the selected resistances were injected into the circuit. The record of the movements of the recording fader 13 is made upon a recording chart 18 which is operated synchronously with the operation of the sound recording film or phonographic disc. so that the record chart 18 and the sound film or disc are calibrated with each other.

The apparatus for producing the record on the chart 18 comprises a spring motor 19 drawing a train of gears 20 which cause an upright shaft 21 to revolve and with it a turn table 22. The shaft 21 and mountings for the gear train 20 are carried in a hanger 23 mounted on the underside of a table 24 standing on four upright legs 25.

The recording chart 18 in practice is a paper member having a plurality of concentric circles, preferably forty in number, which are equally spaced from each other and begin at a point about one inch from the center. Radial lines are also printed on the surface of the recording chart, the radial lines representing minutes and groups of seconds. It has been ascertained by careful calibration that since the chart 18 has approximately a fifty inch circumference and the time of rotation thereof is twenty-four minutes, then the radial lines designating the minutes are spaced approximately two inches apart while the second lines being twelve in number between two minute lines are each spaced approximately one sixth of an inch from the adjacent second line at the periphery of the disc. The concentric circles are numbered from one to forty for the purpose hereinafter described.

The table 24 consists of a top approximately twenty inches square in which a slot 26 is provided. The slot 26 projects from one edge of the table 24 to a point one inch from the center thereof and has a width of three inches.

The recording chart 18 receives its record from the movements of a stylus or other marking device 27 which projects downwardly through the slot 26 in the table 24 and which is supported upon an arm 28 movably supported above the table top. The support for the arm 28 is a bar 29 mounted along a line parallel to the longer side of the slot 26. This bar 29 is a metal strip and the portion of the arm 24 embracing it is metal and carries the current from one to the other. The arm 24 extends beyond the bar 29 and away from the slot to provide a contact finger 30 which engages in turn any one of a series of contacts 31 forming a fader 32, which is also mounted upon the table in a line parallel with the bar 29.

The fader 32 comprises a group of resistance or impedance units 33 of the well known type now used in the control of sound reproduction. Each unit 33 at one end is connected by a single wire to one of the contacts 31 and at the opposite end to a lead off wire which is part of a normal circuit having the amplifying means 17 as a part thereof. The arm 28 is manually operated by sliding it along the bar 29 and the current reaching the contact points 31 will pass through the finger 30 and thence through the bar 29 to the amplifier, finally reaching the original source of current.

When the sound track film operation begins, at the same instant that the gear train 20 rotating the chart 18 is set in motion and the stylus 27 begins to record in a circular line any point at which the arm 28 has been set, it being understood that the stylus is temporarily fixed and the recording chart 18 is rotating. If the fader resistance in the circuit is not permitting a suitable sound to come out of the sound apparatus, then the arm 28 is adjusted to a new position along the bar 29 and a different capacity resistance unit 33 is introduced into the circuit with a result that the volume of sound will either be increased or reduced. The stylus comprises a stylographic pen and during this adjustment is making a substantially radial ink line upon the chart 18.

When the correct resistance unit 33 has been made a part of the circuit, the stylus rests on its point until a new correction is required and it follows that the record left by the marker is a line comprising a series of curved and radial connecting portions indicating movement and the time of such movement proportioned against the synchronous start of the recording chart 18 and the sound recording film.

When the recording chart 18 is completed and removed from the turn table 22, it is placed upon a cork bed and over it is superimposed a thin celluloid disc 34 of the same size as the recording chart 18. Then with a press knife or other means, the celluloid disc is cut through in pie shaped or triangular sections 34a, each section being given a number in sequence, so that all sections may be later reassembled in their proper order. These sections are cut so that one side of the section is exactly at the point where the recording stylus left one position for a new position and the other side of the section will be the point where the new position was succeeded by the next position, as illustrated in Figure 5.

Referring now to Figure 6, a box 35 with upper and lower sections is now prepared, an electric lamp 36 being placed in a socket in the upper section and the electric circuit carried into this lamp from a storage battery 37—the circuit, however, passing thru an external rheostat 38 or group of resistance units 38. In a partition between the upper and lower section is a slot or lens or prism 39, normally closed by a camera shutter 40.

I now place on our pie shaped sections of celluloid a coating 34b of nitrate of silver ready for photographic exposure and we then place each of these sections, thus prepared, into the lower portion of the prepared box— one at a time.

I then light the electric lamp, but inject into the circuit a predetermined unit of resistances by means of the rheostat. These resistance units 38 have been experimently ascertained to be correct to so vary the light as to affect a given shade on a photographic film.

When the established section is laid into the box and the exact quantity of light is ready in the upper section of the box, then I snap a photographic shutter which exposes the pie shaped section to the light. I then fix the resultant photograph by the ordinary method. The resistance elements in this light circuit are calibrated in proportion to the resistance or impedance units 33 in our recording fader 32, as indicated by our chart.

When all the pie shaped sections have been photographically exposed and fixed, they are grouped into the ordinary original circular disc 34 and made into a negative 41, which is then photographically exposed to a new circular disc of nitrated celluloid or glass which is much smaller, being perhaps 4½" in diameter and the operation being merely the reproduction of a photograph to a smaller size, see Figure 7.

This small disc 41 is now the shade screen 10 used at the above mentioned sound reproduction point, being injected across the path of light to the photo cell and rotated by means of a train of gears.

Because of this, we propose to project across the path of the light 42 of fixed intensity, see Figure 8, which is known as an exciting lamp, our screen B of varied shades, which has been prepared as described above; it is intended to place this shade screen just beyond the partition 43 having the slot 44 thru which the light of the exciting lamp passes, so placing the screen that its outer edge will just cover the slot; I then slowly rotate this shadow screen by means of a train of gears 45, so that one or nearly one revolution of the screen will occur during the entire running of what is termed a "2000 foot film reel". It is intended, of course, that the slow rotary motion of our shadow screen will commence at the same instant as does movement of the film reel; the train of gears will be released by a magnetic latch used in the same circuit as is the motor which operates the reel mechanism, so that when the operator closes the switch to start this motor, he will synchronously operate the magnetic latch.

In operation, the exciting lamp in the pick-up box is lighted, our shade screen moves before the partition and the resultant light passing thru our shade screen falls on the photo electric cell, which then permits current to pass in more or less degree as it receives more or less light precisely as is the case when the sound track is used, altho the sound track is now entirely absent. I have herein provided for films wherein a portion of the film only is covered by the picture and the remaining portion of the film is provided with a sound track or the empty space where such sound track might be placed. However, I am mindful of the condition where the photographic film may be completely covered from edge to edge with the pictures to be shown upon the screen. In such film, no sound track appears nor is any space therefor provided. In this latter case, I propose to run my leads from the phonographic pick-up independently to a separate so-called pick-up box containing a light of fixed intensity, lenses, vertical partitions, slot and light sensitive cell as hereinabove described. The corrective shade screen for phonographic use is made at the source of manufacture in exactly the same manner as that made for use with the sound track.

A vertical post 51 is fixed beside the plate 50 and on the upper end is fastened a spring contactor 52, one end of which normally rests on the top side of the plate 50, just inside its edge. This contactor 52 is metal and to the end mounted on the post 51, is attached a wire 53 which leads to a magnet 54 through a storage battery 55. A second wire from magnet 54 is electrically attached to the shaft 49 by means of a connection 56. Adjacent the magnet 54 and its armature 57 is a spring or motor driven train of gears 58, rotating a vertical shaft 59 on which is horizontally fixed a 10" disc 60 of fibre and about two or three inches above same, a similar horizontal disc 61.

Above disc 60 and rigidly fastened to the shaft 59 is a horizontal ratchet wheel 62 perhaps 3" in diameter, having in mesh with its teeth a "holding dog" 63, having a tooth or projection at each end, and a projection in its rear being in the path of the armature 57.

At the edge of and on the upper side of disc 60 is a circular row of fuse clips 64 with a contact running thru the fibre to the other side and terminating in a flat contact head 65. On the under side of disc 61 is a circular row of similar fuse clips 66, each thereof having a contact pin 67 running to its upper face.

A group of detachable resistance units 68 constructed in cartridge form is set into the fuse clips 64 and 66 in upright position between discs 60 and 61.

Adjacent discs 60 and 61, I mount a vertical post 69 on an independent fixed support, having at its lower end a horizontal contactor 70 insulated from the post, the contact resting upon and pressing against one of the contacts 65 on the under side of plate 60. At the upper end of the post 69 is a similar insulated contactor 71 resting on and pressing upon any one of the contact points 67 on the upper side of the plate 61, but just above the selected contact point on the lower plate. From each of the contactors 70 and 71 on this post, a wire 72 is led away, the wires from the upper contactor going to the positive terminal of a storage battery 73 and the wiring from the lower contactor going to an electric lamp 74, which is the means hereinafter described, and thence to the negative side of the storage battery.

The operation of this mechanism is as follows: When the punched celluloid disc 46 is placed on the rotating plate 50 and the gear train 50 is released synchronously with the release of the photographing mechanism which is moving the film to be photographed, the contactor 52 normally rests upon the celluloid disc, but during the rotation of the disc, the contactor 52 which is sharpened and pointed downward projects thru a punched hole 47 in the celluloid disc 46 to the metal plate 50 which completes the circuit from storage battery 55 thru the shaft 49, the plate 50, and the magnet 54 back to the storage battery.

The armature 57 is drawn to magnet 54, permitting the ratchet holding lever 63 to move under the impulse of the spring driven gear train 58 which is always striving to operate but is normally held in check by the holding dog 63.

This holding dog lever 63 makes but one motion permitting the rotation of the rachet a distance of one tooth only, which thus permits a slight rotary motion of plates 60 and 61. This slight rotary motion of the plates carries their contact buttons 65 and 67 slightly forward, so that the post contactors 70 and 71 rest on the next successive pair of lower and upper contact pins.

The spring contactor 52 only holds contact with plate 50 for an instant and as 52 passes over to the celluloid disc 50, beyond the hole 47, the circuit is again broken and the armature 57 returns to normal position, thus blocking the holding dog lever 63 and preventing the train of gears 58 from rotating further.

In this operation, I have injected into the photographic light circuit a new and different resistance element in the form of the cartridge unit 68.

In the box, above the travelling film, is the lamp 74 of perhaps 12 candle-power, which normally is projecting its rays thru a pencil prism in a partition, which closes the lamp box over the travelling unexposed sound track. The pencil prism is designed to pass the photographic light to the film thus travelling. It is, of course, intended that the picture reprint lamp will have only printed the picture proper and will not have exposed to light the sound track, which I now intend to print by my device. The intention is that a dividing partition will have been placed in the picture reprint device, so that the sound track will be exposed to light only when it reaches our particular photographic box. A flexible shaft 78 will run from the motor 58 which is running the resistance discs 60 and 61 so that the movement thereof will be synchronized with the movement of the film 77, the mechanism being timed to operate only 1/450 as fast as that of the film. The film reel normally travels in a picture booth ninety feet per minute and if it is assumed that it travels the same speed when the reprint is being made from a negative, then the relation of gears 48 would be one revolution in 24 minutes, so that the edge of the plate 50 travels 2″ in one minute, while the film travels 90 feet in the same time.

When the punched celluloid disc 46 on table 50 operates magnet 54 and permits the successive resistance on units 68, to come into the circuit, then I vary the 12 candle-power lamp 74 by injecting a new resistance, decreasing or increasing the light of the photographic lamp and making the photographic sound track lighter or darker, as I find the correction chart requires.

The resistance units 68 arranged between discs 60 and 61 have been made by calibrating certain resistance against our correcting fader resistance 32. To find the required value of these resistances, I first find experimentally the quantity of light reduction or light increase, which is required to modify the reprint to make it reproduce sound exactly as does the injection into a similar circuit and under similar conditions of any given one of the resistances in my recording fader.

For example, if I find the indication in my recording fader 32 with the injection at 70 seconds after the synchronous start of a film reel, of a resistance equal to fader markings #9, makes the proper correction in the circuit then I would establish the particular resistance in the photographic light circuit, which is required to increase or decrease the light 74 to the point where the same sound will be reproduced from the film being printed and when I establish this particular resistance unit 68 affecting this, it will be labelled unit #9.

The resistance at each point on my recording fader 32 will have calibrated with it a resistance unit 68 designed to affect the light, which will so form the print that it will produce sound equal to that produced with the equivalent fader resistance in the sound circuit I have experimented with.

When my recording fader 32 indicates that a correction is required, the chart on which the marker has been acting will thus indicate the particular resistance unit required to affect my light.

Thus I build up a resistance holder, filling it with the successive resistances 68 which must be used to affect the light exactly as required.

Having now described my invention, what I claim is new and desire to secure by Letters Patent is:

1. In an apparatus for charting sound corrections required in talking picture reproduction apparatus having sound reproduction means, the combination of a turn table rotating at a predetermined speed, a charted disc carried by the turn table, a rheostat in electrical connection with the sound reproduction means of a film projector, comprising a series of resistances, contact members for each resistance, and a contact finger movable from one contact to the next to bring each resistance into a circuit, said finger having a stylus movable therewith and in contact with the charted disc to translate movement of the finger in terms of lines upon the charted disc.

2. In an apparatus for using the lines of a charted disc according to claim 1, which comprises a metal contact plate having an insulating coating upon which the chart is placed, said coating being provided with peripheral holes corresponding to the readings of the chart, an electric circuit of which the contact plate is a part, means for rotating the plate, a contact in said circuit and disposed in the path of the holes in said insulating coating, a magnetic escapement mechanism in said circuit, and an auxiliary electric circuit comprising a plurality of resistance units movable with said escapement mechanism, contact means leading to opposite ends of the resistance units as they are moved in contact therewith and a photographic lamp which glows with the current not taken up by the resistance in the circuit.

3. In an apparatus for determining sound values, the combination of a turn table, a group of resistance units, a radial line chart moving on the turn table, a stylus for marking said chart, said stylus being fixed to a manually operable contact bar for injecting selected resistances into an electric circuit.

In testimony whereof he has affixed his signature.

WILLIAM N. BARLOW.